United States Patent Office 3,340,527
Patented Sept. 5, 1967

3,340,527
CONDITION MONITORING SYSTEM
William G. Rowell, Milton, Mass., assignor to Technical Marketing Associates, Inc., Concord, Mass., a corporation of Massachusetts
Filed Jan. 13, 1965, Ser. No. 425,165
8 Claims. (Cl. 340-411)

This application is a continuation-in-part of my copending application Ser. No. 400,382, filed Sept. 30, 1964, now abandoned.

The present invention relates generally to detecting systems and more specifically to a novel, simple and stable method and apparatus for self-checking the integrity of a condition monitoring system through the use of a checking signal created in a unique manner.

Numerous prior art apparatus for providing continuous self-checking systems have been available. For example, one apparatus teaches that the characteristic fluctuation of the event to be detected by the sensor may be utilized for self-checking purposes if the corresponding fluctuation is permitted to pass through the amplifier unintegrated. Another teaches that when the principal signal is applied to the sensor, a reaction in the signal output occurs to feed back to the input a modification preferably in the form of a control signal to thereby chop off the signal from the sensor. Still another teaches that whenever the sensor element itself can fail in an unsafe position, self-checking may be accomplished by periodically chopping off the principal signal before it reaches the sensor such as with a shutter arrangement. In short these prior art references teach that if the principal signal externally applied to the sensor has characteristic fluctuations, they may be utilized for self-checking purposes or that the principal signal can be externally applied to the sensor and the resulting reaction at the output of the system to be fed back to thereby chop off or modify the principal signal at the input for self-checking purposes and that a simulated principal signal can be periodically applied externally to the sensor to thereby periodically energize the system for self-checking purposes. Thus in general these prior art techniques either transmit fluctuations characteristic of the principal signal through the system or alternately de-energize as by opening and closing a switch or by periodically externally applying to the sensor a simulation of the signal or event to be detected. These prior art devices and techniques are more fully set forth in U.S. Patents 2,807,008, 2,798,213, and 2,798,214, all by W. G. Rowell.

The present invention is also concerned with a method and means for continuously self-checking a detection system during its operating period or during the standby periods and is particularly concerned with the problem of providing a warning signal or other indication or controlling action when a predetermined condition exists or when a component failure occurs.

For purposes of definition as herein used we may define a safe failure as the type of failure whereby the condition detecting apparatus provides a false signal thereby indicating that the condition sensor has sensed the event to be detected when actually a component in the system has failed in such a manner as to produce this false indication. While this type of failure may well be classified as a nuisance failure, it is nevertheless a safe failure. An unsafe failure as the term is herein used is created when a component fails in the condition detecting apparatus in such a manner that no signal or indication whatsoever is produced. Thus the monitoring system can be completely inoperative through such failure of components and the assurance or indication produced will be one which falsely indicates the system is operable when in fact it is completely incapable of detecting the event or condition to be detected.

The present invention is particularly concerned with the problem of providing an indicating signal which may be used for control purposes whenever the predetermined event to be detected occurs or whenever, because of any reason whatsoever such as a component failure, a short circuit, or open circuit, the system falsely becomes inoperative. Inasmuch as a moinitoring system can falsely become inoperative through component failure, environmental conditions or manual circumvention, it is a prime concern of this invention that an indication of such a failure be given.

The prior art detection and monitoring systems have failed to solve this problem in a practical, simple, reliable and relatively inexpensive manner. Some prior art systems have achieved a far greater improvement in this respect than others but generally at a sacrifice of reliability due to the additional number of components required to obtain the result. Further, the added cost of these additional components can be of significance in a highly competitive market while the undesirable increase in circuit operational complexity due to the increased number of components can present additional problems in regard to reliability and life of the circuit.

Other advantages, features and objects of the present invention are more fully set forth in the following specification taken in conjunction with the accompanying drawings in which.

Since as stated previously the invention may be used with any type of electrical, electronic, mechanical or electromechanical system, the technique underlying the invention is entirely independent of the type of apparatus used and it is to be understood that while a particular component or other detail may be hereinafter discussed and illustrated in connection with FIG. 1, that it is for purposes of illustration only, it being understood that the values and/or sensitivity of all said components may be changed and still the system would utilize the inventive concept herein set forth.

Figure 1:
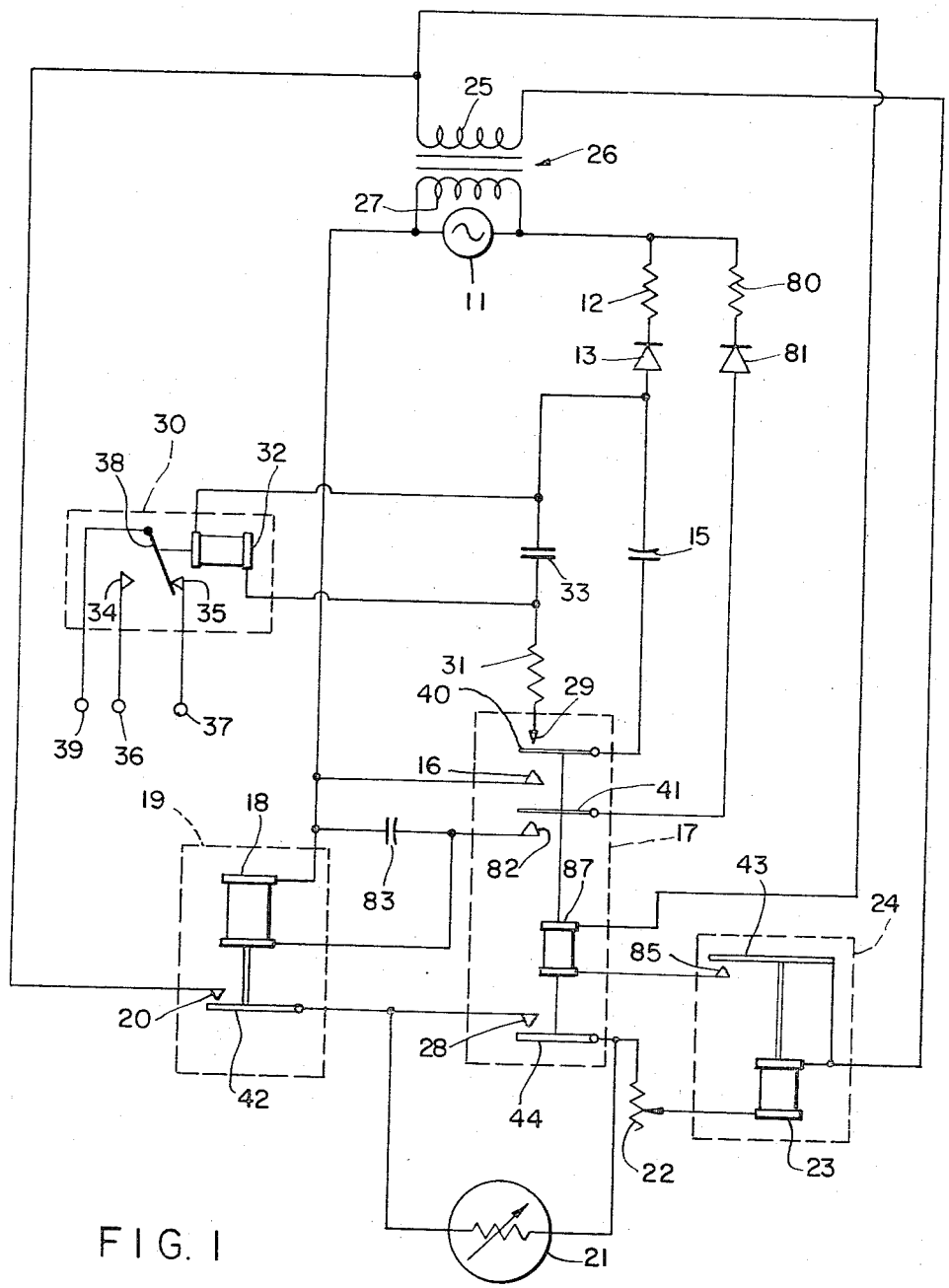
FIG. 1 is a schematic drawing of an embodiment of the present invention.

Referring now to FIG. 1 the invention is first illustrated as applied to a thermal detector. An important application of such a device may be in a fire alarm system or a liquid level sensor in heater or burner control systems.

A power source 11 energizes through switch 40, normally engaging contact 16 of relay 17, a series network comprising a resistor 12, and a rectifier 13 to charge capacitor 15. Simultaneously, source 11 is storing a charge on capacitor 83 maintained in parallel with coil 18 of timing relay 19, and applying a voltage to the coil 18 through a resistor 80, a rectifier 81 and contact 82 of relay 17, normally in engagement with switch 41. Application of this voltage to coil 18 activates relay 19 closing switch 42 to complete a network comprising contact 20, sensor 21, variable resistor 22, coil 23 of relay 24 and the secondary winding 25 of a transformer 26 whose primary winding 27 is maintained across source 11.

Closing of switch 42 permits a current to flow through the sensor element of transducer 21. When sensor 21 is a thermistor, an internal heating due to current flow therethrough occurs and as the thermistor 21 heats up, its internal resistance decreases, causing an increase in the voltage applied to coil 23. When this applied voltage increases to a level determined by the resistor 22 and the resistance and sensitivity of coil 23, the relay 24 pulls in, closing switch 43 across contact 85 thereby energizing coil 87 of slave relay 17 by placing coil 87 directly across the secondary winding 25 of transformer 26. Since relay 17 may be activated only by relay 24, it is referred to as a slave relay.

Activation of relay 17 causes switches 40 and 41 to break their respective connections with contacts 16 and 82 and simultaneously engages switches 40 and 44 with contacts 29 and 28 respectively. Opening of switch 41 and the disengagement of contact 82 interrupts the current flow from source 11 to coil 18. Relay 19, however, does not immediately sense this loss of power since the charge stored on capacitor 83 now leaks off through coil 18 at a low enough rate to hold energized relay 19 for a selected period of time. This time period is, of course, determined by the resistance-capacitor time constant of coil 18 and capacitor 83. Simultaneously sensor 21 is short circuited by the closing of switch 44 across contact 28 thus stopping the flow of current through the sensor causing it to lose its self-heating effect and cool. When the thermistor cools its internal resistance increases.

When the stored charge on capacitor 83 drops below the value required to energize and hold in relay 19, the relay 19 will release, opening switch 42 and de-energizing coil 23, releasing relay 24 which, in turn, disengages switch 43 from contact 85. This opening of switch 43 de-energizes relay 17 which returns to its normal position causing switches 40 and 44 to disengage from contacts 29 and 28 respectively and causing switches 40 and 41 to engage respectively contacts 16 and 82. When contact 82 is re-engaged by switch 41, coil 18 is re-energized and current once again passed through sensor 21 to repeat the previously described cycle. This cycle will continue repetitively until the predetermined event to be detected by sensor 21 occurs or until a component failure in the system occurs.

Returning momentarily to the energizing of relay 17, it is seen that when switch 40 disengages contact 16 and engages contact 29, the charge stored in capacitor 15 now leaks off through resistor 31 to energize coil 32 of relay 30 and to charge capacitor 33 which is in parallel with coil 32. Capacitor 33 charges to a level sufficient to hold relay 30 energized when switch 40 breaks its connection with contact 29 and re-engages contact 16.

When the system is arranged and operated in the manner previously described, the slave relay 17 is pulsing synchronously with relay 24, thus to all intent and purposes relay 17 may be considered a code transmitter. In operation, when all components in the system are functioning in their normal manner and the event to be detected has not occurred, relay 17 pulses to open and close switches 40, 41 and 44. The dwell time of switch 40 on contacts 16 and 29 is equal. In other words, switch 40 engages contact 16 for a selected time period following which it disengages contact 16 and engages contact 29 for an equal period of time. This time period and the value of resistor 12 determines the voltage or charge stored in capacitor 15.

The charge thus stored in capacitor 15 as stated previously is transferred to the coil 32 of relay 30 and to capacitor 33 which are so arranged that any substantial pulse deviation caused by a change in dwell time of switch 40 on either contacts 16 or 29 will result in a release of relay 30.

For example, if we assume that relay 17 for some reason fails to disengage switch 40 from the contact 16 or fails to engage switch 40 with contact 29, the charge stored on capacitor 33 leaks off through coil 32 until the voltage applied to coil 32 by capacitor 33 falls to such a low level that relay 30 is released. The same event occurs if switch 40 engages contact 29 for too long a period, since the charge in capacitor 15 leaks off to capacitor 33 and coil 32 and eventually neither capacitor 15 nor 33 retains sufficient voltage to hold relay 30 in. Thus, to all intents and purposes, the relay 30, in combination with capacitors 33 and 15, can be considered a pulse-width, pulse-space, pulse-rate decoder.

Returning momentarily to sensor 21, we find that during the period that relay 19 is held in by the capacitive charge stored on capacitor 83, that the sensor loses its self-heating effect and cools, thus substantially increasing its internal ohmic resistance. When the stored charge in capacitor 83 drops below the holding voltage required for relay 19, the relay releases, and in releasing, opens the energizing circuit for relay 24 by disengaging switch 42 from contact 20. When the switch 42 disengages the contact 20, relay 24 is now released and accordingly disengages switch 43 from contact 85 releasing relay 17 which opens the connection between switch 40 and contact 29 and switch 44 and contact 28 and re-engages contacts 16 and 82 by closing switches 40 and 41, respectively. In this event, relay 19 is once again energized connecting switch 42 to contact 20 and passing the current once again through sensor 21. The sensor upon becoming re-energized will again substantially lower its internal ohmic resistance because of this predetermined degree of self-heating and recycles in the same manner previously described. The above cycling continues until the predetermined event occurs or until a component failure of the system occurs.

When the normal event to be detected occurs, a change from the normal pulsing rate takes place. This, of course, causes relay 30 to become de-energized in the manner previously described.

Returning now to relay 30, we find associated therewith additional contacts 34 and 35 leading to terminals 36 and 37, respectively. The switch 38 of relay 30 is also connected to a terminal 39. The switch 38 normally engages contact 35 when relay 30 is energized. If the terminals 36, 37, and 39 are connected to a suitable indicating and/or control apparatus, well known to those skilled in the art, then breaking the connection between switch 38 and contact 35 and engagement of contact 34 by switch 28 causes the appropriate indicating or control action to occur.

A specific embodiment of the circuit shown in FIG. 1 has been constructed using the following listed components:

| | |
|---|---|
| 26—Transformer | Thordarson 21F27 filament transformer pri. 117 v. 50/60 c.p.s., sec. 26.5 v. @ .6A. |
| 13 and 81—Selenium rectifiers | Sarkes Tarzian M–150. |
| 24—Sigma relay | 11FZ—550 ACS— SIL, 550 ohms 18 v. AC. |
| 17—Potter and Brumfield relay | KA 14 AY, 24 v. AC, 3 PDT. |
| 19 and 30—Potter and Brumfield relays | KDP 11, 10,000 ohms plate relay, DPDT. |

12—5000-ohm wire wound 5-watt resistor IRC PW5.
80—180-ohm 1-watt resistor.
22—500-ohm Centralab potentiometer, B–4.
31—180-ohm 1-watt resistor.
15 and 33—40 mfd. electrolytic capacitors.
83—8 mfd. electrolytic capacitor.
21—Veco thermistor glass probe 41, A11, 50,000 ohms @ 25° C.

These components may be changed by one skilled in the art in order to change the sensitivity of the circuit or to adapt it to other type sensors.

Any type sensor or transducer to detect the desired condition may be used. For example, the sensor may have negative or positive coefficients of resistance or be sensitive to light, modulation, strain, radiation, fluid, pressure, vacuum and further may have rectifying, amplifying or other characteristics.

Assuming that the circuit is being operated with the above-identified components, then we find that with a half-setting of the variable resistor 22, a normal pulsing rate of about one-half second or 2 c.p.s. occurs and the switch 40 will dwell for about one-quarter second on each of the contacts 16 and 29. This provides a normal voltage initially across the winding 32 of approximately 60 volts. This initial voltage drops to about 25 volts before it recovers to about 40 volts and thereafter during pulsing, normally swings between the limits of approximately 25 to 40 volts after the initial higher voltage occurs. This voltage of 25–40 volts accordingly holds in relay 30 which is adjusted to drop out at approximately 16 volts.

When the system is utilized as a liquid level detector, for example, the thermal transfer of heat from the sensor 21 to the liquid coming in contact with the sensor effectively nullifies the self-heating effect, and thus prevents the checking relay 24 from pulsing at its normal rate. When relay 24 ceases pulsing, relay 17 in turn ceases pulsing and due to the depletion of charge on capacitors 15 and 33, as previously described, causes the voltage applied across coil 32 to drop to a level such that relay 30 is deactivated, causing switch 38 to disengage contact 35 and to engage contact 34 giving an indication of the detection of the event.

If the system is utilized to detect a predetermined degree of ambient temperature, then the occurrence of this event will also be signified by the de-energizing of the load relay. However, in this case, the high ambient temperature prevents the rapid cooling or thermal transfer of heat from the sensor when it is short circuited by switch 44 engaging contact 28. This causes the dwell time of switch 40 on contacts 16 and 29 to be disrupted and made of unequal duration to cause an insufficient voltage to be transferred from capacitor 15 to relay coil 32 and capacitor 33. This insufficient voltage transfer causes the voltage applied to coil 32 to drop permitting relay 30 to drop out disengaging switch 38 from contact 35 and engaging contact 34.

The system, as previously mentioned, may also be utilized to detect a failure in any component part of the system. For example, if the internal element of the sensor or the cable connecting the sensor to the circuit becomes shorted, the pulse rate changes to the extent that the dwell time of switch 40 on contacts 16 and 29 becomes considerably shortened, thus once again the voltage across the winding 32 of relay 30 accordingly drops. In this case the voltage applied to coil 32 is approximately 8 volts, which is only about half of that required to activate relay 30. The relay 30 is thus deactivated again signalling in the above-described manner. In the event that the sensor or associated cable opens, the pulsing ceases causing the load relay 30 again to be deactivated.

If the timing capacitor 83 across the winding 18 of relay 19 opens, relay 19 will rapidly buzz in response to the rectified pulses of the power source. This buzzing repetitively breaks the contact between switch 42 and contact 20 to cause the voltage across the coil 32 of relay 30 to once again drop. In this case the voltage on coil 32 drops to approximately zero.

Open and/or shorts in any of the other system components which can cause a change in the normal pulsing conditions to thereby produce a subnormal integrated voltage across the winding 32 will result in a deactivation of relay 30, thus providing a signal of the failure.

Adaption and changes in the foregoing circuit can be readily made by one skilled in the art. For example, additional temperature sensitive compensating elements can be placed in a bridge circuit to be balanced during period of ambient temperature excursions in which event only a predetermined change of ambient surrounding the sensor or thermal transfer therefrom which upsets the balance of the bridge will be detected. Other arrangements may also be used. For example, a suitable modification of variable resistor 22 may be made to establish a set point from which temperature excursions exceeding a predetermined amount will be indicated. Also multiple sensor arrangements, as well as others, could readily utilize the present invention and thus secure a higher degree of reliability in failsafe operations than heretofore possible. Obviously, such other suitable types of switching arrangements with or without amplification may be used.

Figure 2:
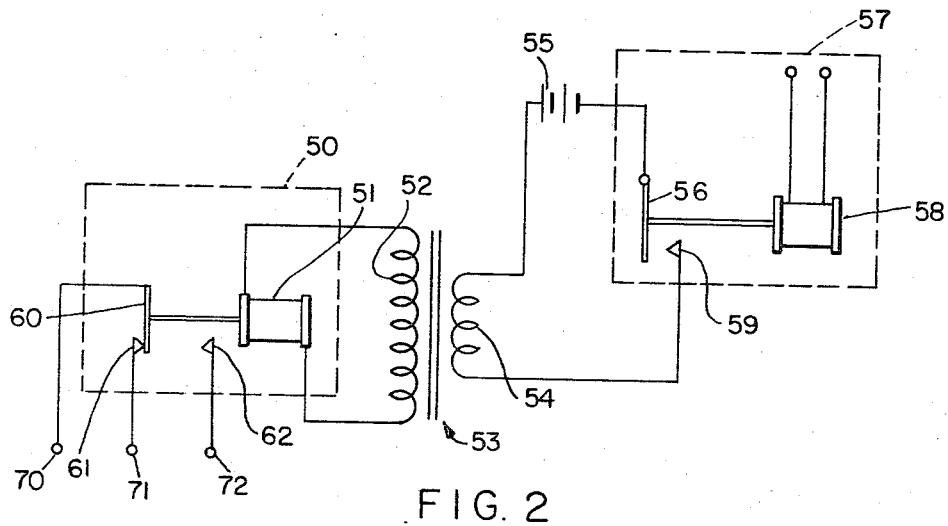
FIGS. 2 and 3 are examples of the many well-known circuits used to integrate the signal from the pulsing load relay to a steady control alarm or other indicating signal.

Turning now to FIG. 2, there is disclosed an additional method of initiating a suitable, visual, audible and/or control action when the proper checking signal is lost in the system of FIG. 1. A load relay 50 which has its energizing coil 51 connected to the secondary winding 52 of a transformer 53 whose primary winding 54 is series connected with a D.C. source of power such as battery 55 and a switch 56. Switch 56 may, if desired, be switch 40 to relay 17 of FIG. 1 or may be a switch of a second relay 57 which serves the same function as that of relay 17, namely, that of a slave relay. This relay 57 would also have to follow relay 24 of FIG. 1. Thus, it is apparent that the device of FIG. 2 could be substituted in the circuit of FIG. 1. Relay 57 would synchronously follow the operation of relay 24 and as long as the proper checking signal was present and being applied to coil 58 of relay 57, switch 56 will make and break a connection with contact 59. This, in turn, repetitively energizes and de-energizes the low voltage primary winding 54 of transformer 53. Transformer 53 is preferably a step-up transformer, providing a stepped-up voltage in secondary winding 52, while relay 50 is designed to be frequency sensitive. This relay 50 will remain energized during the normal voltage fluctuation but becomes de-energized whenever such fluctuations are lost or exceed a predetermined frequency.

In other words, as long as the selected frequency is supplied to coil 51 of relay 50, switch 60 associated with relay 50 will remain in engagement with switch 61. However, when the normal voltage fluctuations are lost or exceed a predetermined frequency, coil 51 loses its energy and switch 60 disengages contact 61 and engages contact 62. As indicated in conjunction with FIG. 1, the switch 60, and contacts 61 and 62 may be appropriately connected by terminals 70, 71, and 72 to indicating and control apparatus as well known in the prior art. The failsafe features of FIG. 2 are obvious to one skilled in the art since a component failure of any nature results in de-energizing of coil 51.

Figure 3:
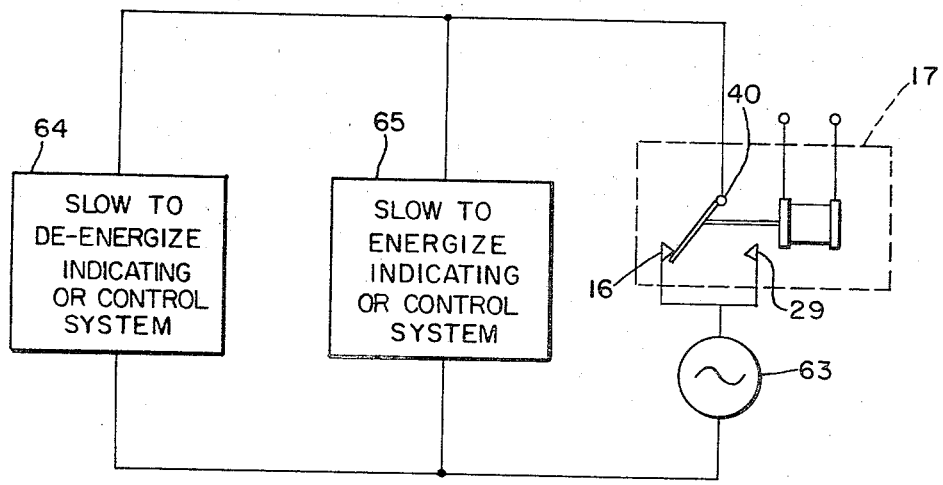

Referring now to FIG. 3, there is shown still another example of initiating any desired visual, audible and/or control or recording action when the proper checking signal is lost in the system of FIG. 1. The relay 17 which is the slave relay under the control of the checking relay 24 of FIG. 1 is shown with contacts 16 and 29 connected together and to one side of a suitable power source 63. The switch 40 of relay 17 is connected through two control systems 64 and 65 to the other terminal of power source 63.

These control systems have opposite reactions to the making and breaking of a circuit and the device operates in this manner: as long as contact switch 40 of relay 17 is currently engaging and disengaging repetitively contacts 16 and 29 at the proper frequency which corresponds to the checking frequency, the slow-to-energize system 65 will be de-energized. Conversely, the slow-to-de-energize system 64 will remain energized. Thus, the two combined integrating and control systems 64 and 65 can provide suitable indication or control action whenever a predetermined variation from the proper checking signal frequency occurs.

It can readily be seen that failure of any of the components of the device of FIG. 1 will result in initiating a desired action by either of the two control systems 64 and 65 when the network shown in FIG. 3 is connected across relay 17 as indicated. For example, a loss of power, open wires, or dirty contacts on relay 17 will result in the initiation of a predetermined signal by the slow-to-energize system 65. A loss of the checking signal, shorted or stuck contacts on relay 17, will result in the initiation of a predetermined signal by the slow-to-de-energize system 64. It is apparent that the integrating arrangements in the two systems are such that the proper input pulses shut down the slow-to-energize system 65 and hold in the slow-to-de-energize system 64.

Many changes and modifications in this system may be made by one skilled in the art without departing from the spirit and scope of the invention. It is, therefore, intended that the scope of the invention only be defined by the appended claims.

What is claimed is:

1. Apparatus comprising input power means, a first relay, a rectifier and a first capacitor serially connected, a second relay having switching means for connecting said power means to said rectifier and said first capacitor and simultaneously connecting the power means to the coil of the first relay, said first relay being energized by the application of said power thereto, a thermistor, said first energization of said relay connecting said thermistor to said power means to internally heat said thermistor, a third, and a fourth relay, the internal heating of said thermistor causing the energizing of the third relay, energizing of the third relay connecting the second relay to said power means, the energizing of said second relay short-circuiting said thermistor and simultaneously disconnecting the power means from said first capacitor and simultaneously connecting said first capacitor to a fourth relay, the energizing of said third and second relays occurring at a periodic rate as said thermistor heats and cools, the fourth relay being continuously energized by the discharge of said first capacitor at said periodic rate, having associated therewith means for indicating deviation from said periodic rate.

2. Apparatus for checking the integrity of a condition detecting system including a sensor which is continuously electrically variable in response to predetermined ambient condition deviations, comprising:
    means for automatically and intermittently internally stimulating said sensor independently of ambient conditions to cause electrical variations within said sensor equivalent to the electrical variations caused by embient condition deviations thereby providing a checking signal; and
    means for indicating the loss of said checking signal during said periods of internal stimulation.

3. Apparatus as in claim 2, wherein:
    said sensor is a continuously variable resistance device; and
    said means for internally stimulating said sensor operates to apply an electrical signal to said sensor to vary the resistance thereof.

4. Apparatus as in claim 3 wherein:
    said sensor is a thermistor.

5. Apparatus for automatically periodically checking the integrity of a condition detecting system which includes a sensor continuously electrically variable in response to predetermined ambient condition deviations, comprising:
    means for internally periodically stimulating said sensor independently of ambient conditions to cause electrical variations within said sensor equivalent to the electrical variations caused by a specific pattern of ambient condition deviations thereby providing checking signals; and
    means for indicating loss of said checking signals.

6. Apparatus as in claim 5, wherein:
    said means for periodically stimulating said sensor provides said stimulations at a predetermined periodic rate;
    said apparatus further comprising means for delaying the response of said means for indicating loss of said checking signal for a time duration greater than one period of said periodic rate;
    whereby said indicating means provides an indication of checking signal loss after said checking signal has been lost for more than one period of said periodic rate.

7. Apparatus as in claim 6, wherein:
    said delay means has a delay time greater than one period of said periodic rate and less than two periods of said periodic rate.

8. Apparatus for automatically periodically checking the integrity of a condition detecting system including a sensor which is continuously electrically variable in response to predetermined ambient condition deviations and similarly electrically variable in response to predetermined internal current variations, comprising:
    a first switching means operating at a predetermined periodic rate to intermittently provide said sensor with current independently of ambient conditions to cause electrical variations within said sensor equivalent to the electrical variations caused by a specific pattern of ambient condition deviations, thereby providing checking signals with predetermined characteristics;
    means operative to preserve said characteristics dependent upon the operational integrity of all included system components, said means being operative upon variations of said components from their normal state to cause said checking signal characteristics to deviate from normal;
    means responsive to deviations in said checking signal characteristics to indicate an abnormality in said system.

References Cited

UNITED STATES PATENTS

| | | | |
|---|---|---|---|
| 2,798,214 | 7/1957 | Rowell | 340—214 |
| 3,044,050 | 7/1962 | Abromaitis | 340—410 |
| 3,175,206 | 3/1965 | Lindberg et al. | 340—410 |

NEIL C. READ, *Primary Examiner.*

D. L. TRAFTON, *Assistant Examiner.*